(12) United States Patent
Wikström (10) Patent No.: US 8,833,314 B2
(45) Date of Patent: Sep. 16, 2014

(54) COOLING SYSTEM FOR COOLING OF A COMBUSTION ENGINE

(75) Inventor: Hans Wikström, Johanneshov (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/110,750

(22) PCT Filed: Apr. 12, 2012

(86) PCT No.: PCT/SE2012/050397
§ 371 (c)(1),
(2), (4) Date: Oct. 9, 2013

(87) PCT Pub. No.: WO2012/148344
PCT Pub. Date: Nov. 1, 2012

(65) Prior Publication Data
US 2014/0026830 A1    Jan. 30, 2014

(30) Foreign Application Priority Data
Apr. 29, 2011    (SE) .................................... 1150379

(51) Int. Cl.
| | | |
|---|---|---|
| F01P 7/14 | (2006.01) | |
| F01P 3/00 | (2006.01) | |
| G05D 23/30 | (2006.01) | |
| F01P 7/16 | (2006.01) | |

(52) U.S. Cl.
CPC . *F01P 3/00* (2013.01); *G05D 23/30* (2013.01); *F01P 7/16* (2013.01)
USPC ....... 123/41.1; 123/41.12; 137/468; 137/872; 236/101 R (58) Field of Classification Search
CPC ... F01P 11/16; F01P 2025/08; F01P 2031/00; F01P 5/14
USPC ............ 123/41.1, 41.12, 41.15, 41.05, 41.08, 123/41.09, 41.04; 137/468, 872, 625.33, 137/625.47, 597, 861; 236/101 R, 93 R, 236/93 A, 34.5
See application file for complete search history.

(56) References Cited

U.S. PATENT DOCUMENTS 4,223,646 A  *  9/1980  Kinder ........................ 123/41.11
5,531,190 A  *  7/1996  Mork ........................ 123/41.12
(Continued)

FOREIGN PATENT DOCUMENTS

| DE | 29 23 523 A1 | 12/1980 |
| DE | 3700037 | 7/1988 |
(Continued)

OTHER PUBLICATIONS

Machine Translation of DE2923523A, see "DE2923523A_Translation.pdf".*

(Continued)

*Primary Examiner* — Noah Kamen
*Assistant Examiner* — Long T Tran
(74) *Attorney, Agent, or Firm* — Ostrolenk Faber LLP (57) ABSTRACT

A cooling system for a combustion engine (1) includes a pilot line (12) which has an inlet (12*a*) to receive coolant from a line (3) of the cooling system and a thermostat (6) a sensing element (6*b*) for monitoring the temperature of the coolant in the pilot line (12) and a valve (6*a*). A thermal device (13, 26, 31) in contact with the coolant in the pilot line (12) at a location upstream of the sensing element (6*b*). A control unit (15) estimates when it is appropriate to alter the coolant's operating temperature in the cooling system and, at such times, activates the thermal device (13, 26, 31) so that it warms or cools the coolant in the pilot line (12).

12 Claims, 3 Drawing Sheets

(56) References Cited

U.S. PATENT DOCUMENTS

| | | | |
|---|---|---|---|
| 6,427,663 B1 * | 8/2002 | Breeden | 123/446 |
| 6,508,212 B2 * | 1/2003 | Song et al. | 123/41.1 |
| 8,109,242 B2 * | 2/2012 | Deivasigamani | 123/41.1 |
| 2011/0088792 A1 | 4/2011 | Ito et al. | |

FOREIGN PATENT DOCUMENTS

| | | |
|---|---|---|
| EP | 2 037 097 A2 | 3/2009 |
| SE | 532 354 | 12/2009 |

OTHER PUBLICATIONS

International Search Report dated Jul. 5, 2012 issued in corresponding International patent application No. PCT/SE2012/050397.

International Preliminary Report on Patentability dated Jul. 22, 2013 issued in corresponding International patent application No. PCT/SE2012/050397.

\* cited by examiner

COOLING SYSTEM FOR COOLING OF A COMBUSTION ENGINE

CROSS-REFERENCE TO RELATED APPLICATIONS

The present application is a 35 U.S.C. §§371 national phase conversion of PCT/SE2012/050397 filed Apr. 12, 2012, which claims priority of Swedish Application No. 1150379-4, filed Apr. 29, 2011, the contents of which are incorporated by reference herein. The PCT International Application was published in the English language.

BACKGROUND TO THE INVENTION AND PRIOR ART

The present invention relates to a cooling system for cooling of a combustion engine.

Cooling systems for cooling of combustion engines in vehicles usually comprise a thermostat which regulates the temperature of the coolant in the cooling system. The thermostat comprises a sensing element and a valve. The sensing element may contain a wax substance which changes phase at the thermostat's regulating temperature. The sensing element causes the valve to direct the coolant to the engine without cooling at times when the coolant is at a lower temperature than the thermostat's regulating temperature. At times when the coolant is at a higher temperature than the thermostat's regulating temperature, the sensing element causes the valve to direct the coolant to a radiator for cooling. Such thermostats are inexpensive and operationally reliable.

Thermostats maintain a substantially constant operating temperature of the coolant in the cooling system. It is however not always desirable to maintain a constant operating temperature of the coolant in a cooling system. A known way of varying the operating temperature of the coolant is to provide the sensing element with an electrical warming element. Such a warming element may be used to cause the wax substance in the sensing element to be warmed and change phase at times when the coolant is at a lower temperature than the thermostat's regulating temperature. The coolant's operating temperature in the cooling system may be varied by varying the degree of warming of the wax substance.

SE 532 354 refers to a thermostat in a cooling system for cooling of a combustion engine. The thermostat comprises a valve situated in a line which receives warm coolant from the engine, and a sensing element situated in a pilot line in the cooling system where it monitors the temperature of the coolant which is led to the engine. In this case the temperature of the coolant which is led into the engine serves as the operating temperature. This temperature is in many cases a more relevant control parameter than the temperature of the warm coolant leaving the engine.

SUMMARY OF THE INVENTION

The object of the present invention is to propose a cooling system with a circulating coolant for cooling of a combustion engine whereby it is possible to control the coolant's operating temperature in a simple and reliable way.

This object is achieved with the cooling system of the kind mentioned in the disclosure hereof. By means of a pilot line it is possible for coolant to be led to the thermostat's sensing element from substantially any region of the cooling system. The cooling system's operating temperature in that region of the cooling system thus serves as a control parameter for the thermostat. The cooling system comprises a thermal device which can warm or cool the coolant in the pilot line at a location upstream of the sensing element in the pilot line. When the thermal device is not activated, the sensing element monitors the coolant's operating temperature close to the pilot line inlet. In this case the thermostat maintains a constant operating temperature of the coolant which corresponds to the thermostat's regulating temperature.

When the thermal device is activated and warms the coolant in the pilot line, then close to the sensing element the coolant assumes a temperature corresponding to the coolant's operating temperature plus the temperature rise which the thermal device imparts to the coolant in the pilot line device. The coolant close to the sensing element in the pilot line thus assumes initially a higher temperature than the regulating temperature. The thermostat opens, thereby directing substantially all of the coolant to the radiator for cooling. This cooling leads to the coolant's operating temperature dropping. The coolant's operating temperature drops to a value which in conjunction with the thermal device's temperature rise results in the coolant in the pilot line assuming a temperature corresponding to the thermostat's regulating temperature. In this case the coolant in the cooling system thus assumes a lower operating temperature. When the thermal device is activated and cools the coolant, then close to the sensing element the coolant assumes a temperature corresponding to the coolant's operating temperature minus the temperature lowering which the thermal device imparts to the coolant in the pilot line. When this happens, the sensing element detects that the coolant in the pilot line is at a lower temperature than the regulating temperature. The thermostat therefore directs substantially all of the coolant to the engine without cooling. The coolant's operating temperature rises to a value which, in conjunction with the thermal device's temperature rise, results in the coolant in the pilot line assuming a temperature corresponding to the thermostat's operating temperature. In this case, the coolant in the cooling system thus assumes a higher operating temperature. Warming or cooling the coolant in the pilot line makes it possible for the coolant's operating temperature in the cooling system to undergo a corresponding temperature change albeit in an opposite direction.

According to an embodiment of the invention, the thermal device comprises an electrical warming device which in an active state is adapted to warming the coolant in the pilot line so that it assumes a higher temperature than at the pilot line inlet. An electrical warming device may be of relatively simple configuration in the form of an electrical heating conductor. With an electrical warming device it is also easy to raise the coolant's temperature in the pilot line with good precision. In this case a thermostat is used which has a regulating temperature corresponding to a maximum operating temperature of the coolant. When the electrical warming device is activated, the coolant in the pilot line is warmed by a similar number of degrees to that by which its operating temperature in the cooling system is lowered.

According to an alternative embodiment of the invention, the thermal device comprises a heat exchanger in the pilot line which in an active state is adapted to having a medium passing through it which is at a higher or lower temperature than the thermostat's regulating temperature. A medium which is at a higher temperature than the thermostat's regulating temperature might be exhaust gases, motor oil, retarder oil or some other warm medium available in a vehicle. A medium with a lower temperature than the thermostat's regulating temperature might be air which is with advantage at a temperature corresponding to that of the surroundings.

According to a further alternative embodiment of the invention, the thermal device comprises a coolant line which in an active state is adapted to supplying coolant, which is at a higher or lower temperature than the thermostat's regulating temperature, to the pilot line at a location upstream of the sensing element. Warm coolant is with advantage taken from a region of the cooling system in which the coolant is at its highest temperature. The coolant has its highest temperature after it has cooled the engine and, where applicable, cooled some further component in the cooling system. Cold coolant is with advantage taken from a region of the cooling system in which the coolant is at its lowest temperature. The coolant has its lowest temperature in the cooling system after it has been cooled in the radiator.

According to another preferred embodiment of the invention, the control unit is adapted to controlling the activation of the thermal device on the basis of information from a temperature sensor which monitors the coolant's temperature at a location downstream of the thermal device in the pilot line. By means of such a sensor, the control unit receives rapid information about how many degrees the thermal device warms or cools the coolant in the pilot line. On the basis of this information and the thermostat's regulating temperature, the coolant's operating temperature can be controlled with good precision.

According to another preferred embodiment of the invention, the control unit is adapted to receiving information about the load upon the engine and to activating the thermal device with the object of giving the coolant in the cooling system an operating temperature which varies with changes in engine load. It is usually appropriate to give the coolant in the cooling system a high operating temperature when the engine load is low, and a low operating temperature when the engine load is high. Gradual or stepped adjustment of the coolant temperature may be applied according to engine load. The coolant in the cooling system may be intended to cool at least one further component other than the engine, and the control unit may be adapted to receiving information which indicates in advance when said component needs cooling by the cooling system and, when such is the case, to activating the thermal device so that the coolant's operating temperature drops before the cooling of said component begins. Certain components such as a hydraulic retarder require a large cooling capacity when they are activated. A positioning indicator such as a GPS may be used to determine the vehicle's location and therefore whether the vehicle is approaching a downhill run on which the retarder is most likely to be activated.

According to another preferred embodiment of the invention, the pilot line inlet is situated in a line which leads coolant to the engine. In this case coolant is thus led into the pilot line which will be at the same temperature as the coolant which is led into the engine. The coolant's inlet temperature to the engine is a very good control parameter for a thermostat.

According to another preferred embodiment of the invention, said sensing element comprises a casing containing a substance which is adapted to changing phase and consequently volume at the thermostat's regulating temperature. Such a substance is with advantage a wax substance which changes phase from solid state to liquid state at the thermostat's regulating temperature. The thermostat may comprise a motion-transmitting mechanism adapted to transferring motion from the sensing element to the valve so that the latter moves between a first position and a second position when said substance changes phase. The motion-transmitting mechanism may comprise a rod or the like. The rod may extend through at least one wall which separates the pilot line where the sensing element is situated from the cooling system's line in which the valve is situated.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE PRESENT INVENTION

Figure 1:
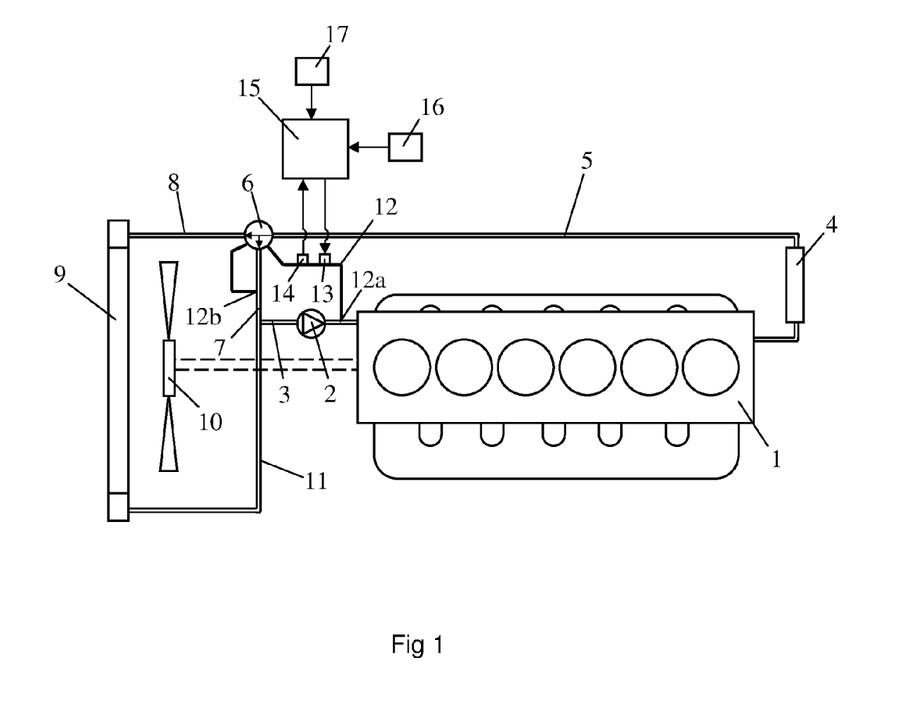
FIG. 1 depicts a cooling system for a combustion engine according to a first embodiment of the present invention.

FIG. 1 depicts a cooling system for cooling a combustion engine 1 which drives a vehicle. A coolant pump 2 circulates coolant in the cooling system. The coolant pump 2 is situated in an inlet line 3 to the engine 1. After it has circulated through the engine, the coolant is led to an oil cooler 4 to cool oil which is used in a hydraulic retarder. The coolant is then led through a line 5 to a thermostat 6. The thermostat 6 directs the coolant in the line 5 to the engine via a return line 7 and the inlet line 3 at times when the coolant is at a lower temperature than the thermostat's regulating temperature. At times when the coolant is at a higher temperature than the thermostat's regulating temperature, at least part of it is led via a line 8 to a radiator 9 which may be fitted at a forward portion of the vehicle. A radiator fan 10 draws a cooling air flow through the radiator 9 so that the coolant undergoes effective cooling in the radiator 9. After the coolant has been cooled in the radiator 9, it is led back to the engine 1 via a return line 11 and the inlet line 3.

The cooling system comprises a pilot line 12 which receives via an inlet 12a a small portion of the coolant flow in the inlet line 3. The pilot line 12 leads the coolant to the thermostat 6. The coolant in the pilot line 12 is led back to the return line 7 via an outlet 12b. The coolant led into the pilot line 12 will thus be at the same temperature as the coolant which cools the engine. The temperature of the coolant which is led into the engine is here referred to as the cooling system's operating temperature. This temperature is in many cases a better control parameter than the highest temperature which the coolant assumes in the cooling system in the line 5 after it has cooled the engine and the retarder oil in the oil cooler 4. The pilot line 12 comprises a thermal device which can warm and/or cool the coolant in the pilot line before it reaches the thermostat 6. The thermal device in the embodiment in FIG. 1 is a schematically depicted electrical warming device 13. A sensor 14 monitors the coolant's temperature at a location downstream of the electrical warming device 13. A control unit 15 is adapted to controlling the activation of the electrical warming device 13 on the basis of information from the sensor 14, information 16 which is related to the load upon the engine and information from a position indicator 17, possibly a GPS, which monitors the vehicle's location.

During operation of the combustion engine 1, the coolant pump 2 circulates coolant through the cooling system. For optimum cooling of the engine, the coolant led to it needs to be at a suitable operating temperature. A small portion of the coolant flow in the inlet line 3 is therefore led not to the engine but into the pilot line 12. The thermostat 6 monitors the coolant temperature in the pilot line 12 downstream of the electrical warming device 13. If it finds that the coolant in the pilot line 12 is at a lower temperature than the regulating temperature, the thermostat directs the coolant in the line 5 to the engine without cooling. If it detects that the coolant in the pilot line is at a higher temperature than the regulating temperature, the thermostat directs the coolant from the line 5 to the radiator 9 for cooling. A conventional thermostat 6 will endeavour to give the coolant a constant operating temperature corresponding to the regulating temperature. However, maintaining a constant operating temperature for the coolant is not desirable in all operating situations. At times for example when the engine is under heavy load, it is desirable that the coolant be at a lower operating temperature than when there is little load upon the engine. For vehicles equipped with a component which at times imposes a heavy load upon the cooling system, it may be appropriate to lower the coolant's operating temperature before the component is activated. Such a component may be a hydraulic retarder.

The control unit 15 substantially continuously receives information 16 about the load upon the engine. It also substantially continuously receives information from the position indicator 17 about the vehicle's location. The control unit 15 may have stored information such as maps or the like which it can use in conjunction with the vehicle's current location to predict whether the vehicle is approaching a downhill run on which the hydraulic retarder is very likely to be activated. As heavy vehicles often follow predetermined routes, the control unit 15 may alternatively, or in combination, have stored information which predicts the points where the hydraulic retarder will be activated.

In this case a thermostat 6 is used which has a regulating temperature corresponding to a suitable operating temperature of the coolant when there is little load upon the engine and/or at times when the hydraulic retarder is not activated. When it receives information that the engine is under heavy load or that the vehicle is approaching a downhill run, the control unit 15 activates the electrical warming device 13 which thereupon warms the coolant in the pilot line 12. The coolant thus assumes in the pilot line a higher temperature than its operating temperature in the inlet line 3. The warmed coolant in the pilot line 12 thus initially assumes a higher temperature than the regulating temperature. The thermostat 6 is therefore put into an open position whereby all of the coolant in the line 5 is directed to the radiator 9. The result is that the coolant's operating temperature is lowered, and hence also the temperature which the coolant is at when it is led into the pilot line inlet 12a. When the operating temperature has dropped by the same number of degrees as those by which the electrical warming device 13 warms the coolant in the pilot line 12, the coolant in the pilot line again assumes a temperature corresponding to the thermostat's regulating temperature. So long as the electrical warming device 13 is activated, the coolant will thus be at a lower operating temperature than the regulating temperature. The more degrees by which the electrical warming device 13 warms the coolant in the pilot line, the more the operating temperature can be lowered, resulting in more effective cooling of the engine and the retarder oil in the oil cooler 4. When the control unit 15 deactivates the electrical warming device 13, the coolant in the pilot line assumes initially the coolant's operating temperature. The thermostat 6 is therefore put into a closed position whereby it directs substantially all of the coolant in the line 5 to the line 7 and the engine without cooling via the radiator 9. The result is that the coolant's operating temperature rises until it reaches the thermostat's regulating temperature.

Figure 2:
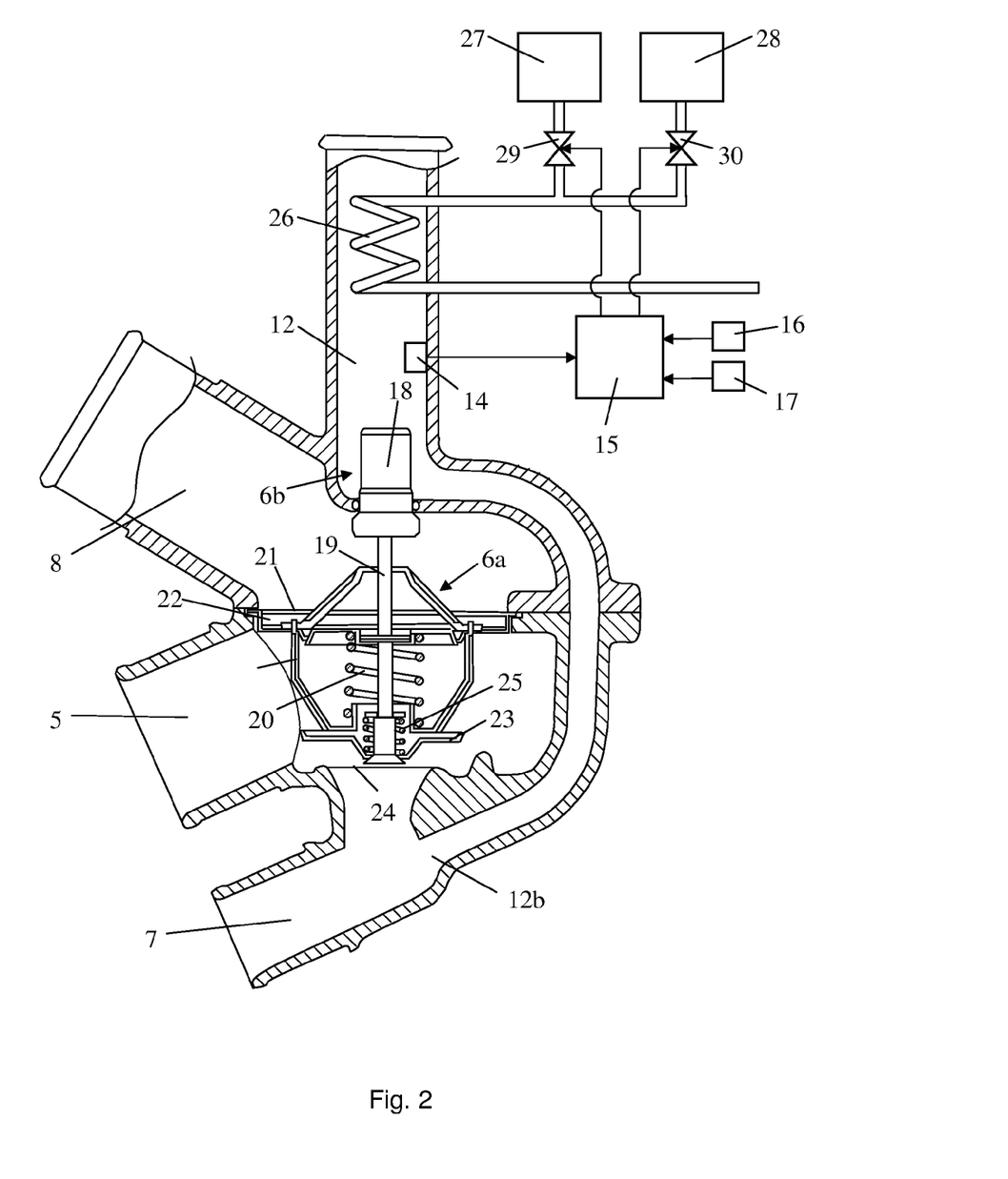
FIG. 2 depicts a cooling system for a combustion engine according to a second embodiment of the present invention and FIG. 3 depicts a cooling system for a combustion engine according to a third embodiment of the present invention.

FIG. 2 shows how the thermostat 6 may be configured in more detail. The thermostat is situated in a casing which has connections to the four lines 5, 7, 8 and 12. The thermostat comprises a valve 6a fastened to a rod 19 which has an upper end portion fastened within a sensing element 6b. The sensing element is situated at an appropriate location in the pilot line 12 so that the coolant has good contact with the sensing element. The sensing element has a casing 18 made of thin-walled rigid material which is with advantage metal material with good thermally conductive characteristics. The casing has an internal space surrounding a wax substance which has the characteristic of changing phase from a solid state to a liquid state at the thermostat's regulating temperature. When the wax substance is in the liquid state, its volume is larger than in the solid state.

The casing 18 has rigid walls which surround the wax substance in all directions except one, which in this case is downwards. When the wax substance melts and increases in volume, it can therefore expand only downwards within the casing. When the wax substance increases in volume, the rod 19 moves downwards. Converting volume change of the wax substance within the casing 18 to linear motion of the rod 19 is conventional prior art and may be done in various different ways. The valve 6a has a return spring 20 adapted to moving the rod 19 and the valve 6a upwards when the wax substance solidifies and thereupon occupies a reduced volume within the casing 18. The return spring 20 exerts upon the rod 19 a resilient force not strong enough to prevent downward movement of the rod 19 and the valve 6a when the wax substance melts and expands within the casing 18. The valve 6a has a first valve disc 21 adapted to closing an aperture 22 between the line 5 and the line 8 when the valve 6a is in its upper first position as in FIG. 2. The valve 6a comprises also a second valve disc 23 adapted to closing an aperture 24 between the line 5 and the return line 7 when the valve is in a lower second position. The second valve disc 23 is tensioned relative to the rod 19 by a spring 25.

In this case the pilot line 12 is equipped with a thermal device in the form of a heat exchanger 26. The heat exchanger 26 comprises a pipe loop connected to a first medium source 27 containing a medium at a lower temperature than the thermostat's regulating temperature, and a second medium source 28 containing a medium at a higher temperature than the thermostat's regulating temperature. The first medium might be air at the temperature of the surroundings and the second medium might be warm exhaust gases from the engine. The control unit 15 may in this case direct air from the first medium source 27 to the heat exchanger 26 by opening a valve 29, and warm exhaust gases from the second medium source 28 to the heat exchanger 26 by opening a valve 30. The control unit 15 receives also here information 16 related to the load upon the engine and information from a position indicator 17, e.g. a GPS, about the vehicle's location.

During operation of the engine, the coolant pump 2 circulates coolant through the cooling system. A small portion of the coolant flow in the inlet line 3 is thus led not to the engine but into the pilot line 12. The coolant led into the pilot line will be at the same temperature as that which is led into the engine. The coolant in the pilot line 12 thus flows in contact with the thermostat's sensing element 6b. At times when the coolant in the pilot line 12 is at a lower temperature than the thermostat's regulating temperature, the wax substance within the casing 18 will be in a solid state and will therefore occupy a minimum volume within the casing. The return spring 20 will therefore keep the rod 19 and the valve 6a in the upper position. In this situation, the first valve disc 21 closes the aperture 22 while the second valve disc 23 frees the aperture 24. The coolant from the engine and the line 5 is in this case led to the return line 7. It is thereafter led to the inlet line 3 and the engine. In this case the coolant thus undergoes no cooling in the radiator 9.

When the coolant is led to the engine without cooling in the radiator 9, its temperature in the cooling system rises. Once the coolant's temperature in the pilot line 12 rises above the regulating temperature, the wax substance begins to melt. When the wax substance melts, its volume increases. The wax substance expands downwards in the casing 18 with the result that the rod 19 and the valve 6a move downwards. When substantially the whole of the wax substance has melted, the valve 6a reaches the lower position at which the second valve disc 23 closes the aperture 24. When the valve reaches this position, the first valve disc 21 will have freed the aperture 22. The spring 25 allows the rod 19 a certain continued expansion downwards relative to the valve 6a. The coolant coming from the engine and the line 5 is led in this case to the line 8 which takes it to the radiator 9. The coolant is cooled in the radiator 9 by surrounding air before being led via the line 11 to the inlet line 3 and the engine 1.

During operation, the control unit 15 substantially continuously receives information 16 about the load upon the engine and information from the position indicator 17 about the vehicle's location. In this case a thermostat 6 is used which has a regulating temperature corresponding to a suitable operating temperature of the coolant when the engine load is normal. When the control unit 15 receives information that the load upon the vehicle is greater than normal or that the vehicle is approaching a downhill run, it opens the valve 30 so that warm exhaust gases from the exhaust gas source 28 flow through the heat exchanger 26. The warm exhaust gases in the heat exchanger 26 warm the coolant in the pilot line 12 so that it assumes a raised temperature when it reaches the sensing element 6b. The wax substance begins to melt in the sensing element 6b and the coolant in the line 5 is directed to the line 8 by the valve 6a and thus to the radiator 9 in order to be cooled. The increased cooling of the coolant lowers its operating temperature. The control unit 15 receives from the sensor 14 information about the coolant's temperature after it has been warmed by the exhaust gases in the heat exchanger 26. The control unit 15 can use the valve 30 to regulate the flow of warm exhaust gases to the heat exchanger so that the coolant's operating temperature is lowered to a suitable value. The coolant led into the engine thus provides effective cooling of the engine and of the retarder oil in the oil cooler 4.

If conversely it receives information that the load upon the vehicle is less than normal, the control unit 15 opens the valve 29 so that cold air from the air source 27 flows to the heat exchanger 26. The cold air in the heat exchanger cools the coolant in the pilot line 12 so that it assumes a lower temperature when it reaches the sensing element 6b. The wax substance in the sensing element changes to solid phase and the thermostat directs the coolant from the line 5 to the line 7. This means that the coolant undergoes no cooling in the radiator 9 and its operating temperature rises. The coolant thus assumes a higher operating temperature than the thermostat's regulating temperature. The difference between the coolant's operating temperature and the thermostat's regulating temperature corresponds to the cooling undergone by the coolant in the pilot line 12. A high operating temperature of the coolant is thus desirable at times when the load upon the engine is low.

Figure 3:
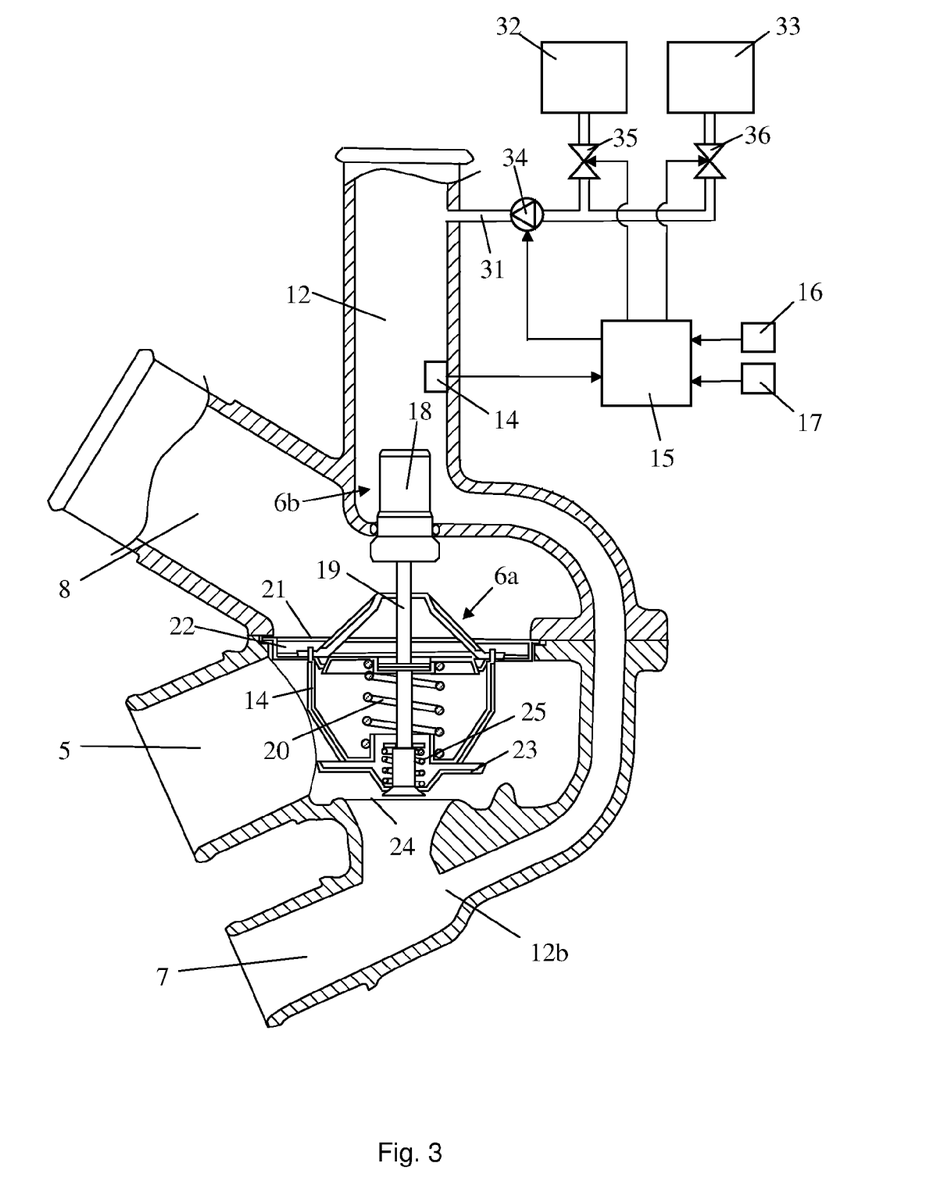

FIG. 3 depicts a further alternative configuration. In this case the pilot line 12 is provided with a thermal device in the form of a coolant line 31 connected to the pilot line at a location upstream of the thermostat's sensing element 6b. The line 31 is connectable to a first medium source in the form of cold coolant 32 which may be taken from the cooling system's line 11, and to a second medium source 33 in the form of warm coolant which may be taken from the cooling system's line 5. The coolant line comprises a pump 34 for conveying coolant to the pilot line from either of said medium sources 32, 33. The pump 34 is activated by the control unit 15. At times when cold coolant is to be led into the pilot line, the pump 34 is activated while at the same time the control unit 15 opens a valve 35 connected to the first medium source 32. When warm coolant is to be led into the pilot line 12 the pump 34 is activated while at the same time the control unit 15 opens a valve 36 connected to the second medium source 33.

Here again, the control unit 15 substantially continuously receives information 16 about the load upon the engine, and information from the position indicator 17. The thermostat 6 has a regulating temperature corresponding to a suitable operating temperature of the coolant when the engine load is normal. When the control unit 15 receives information that the load upon the vehicle is greater than normal or that the vehicle is approaching a downhill run, it activates the pump 34 while at the same time opening the valve 36 so that warm coolant from the medium source 33 is directed through the coolant line 31 and into the pilot line 12. This supply of warm coolant causes the coolant reaching the sensing element 6b in the pilot line to assume initially a raised temperature. The thermostat 6 therefore directs substantially all of the coolant in the line 5 to the radiator 9. The coolant operating temperature therefore drops to below the regulating temperature. The coolant led into the engine thus provides effective cooling of the engine and/or the oil in the oil cooler 4. The control unit 15 can determine how much lower the operating temperature has to be than the regulating temperature by regulating the amount of warm coolant directed into the pilot line 12 by the valve 36.

If conversely it receives information that the load upon the vehicle is less than normal, the control unit 15 activates the pump 34 while at the same time opening the valve 35 so that cold coolant from the first medium source 32 is led into the pilot line 12. This supply of cold coolant in the pilot line causes the coolant reaching the sensing element 6b to assume initially a lower temperature than the regulating temperature. The thermostat 6 is therefore put into a position whereby it directs substantially all of the coolant to the engine without cooling. The coolant's operating temperature is thus raised to a level which exceeds the regulating temperature by a value corresponding to the thermal device's cooling of the coolant in the pilot line. A raised operating temperature of the coolant is thus desirable at times when the load upon the engine is low.

The invention is in no way restricted to the embodiment to which the drawing refers but may be varied freely within the scopes of the claims. The embodiments in FIGS. 2 and 3 use both warm and cold media to alter the temperature of the coolant in the pilot line 12 and such warming or cooling in the pilot line is sufficient to adjust the coolant's operating temperature relative to the regulating temperature. In the embodiment in FIG. 2, substantially any gaseous or liquid media may be used to warm or cool the coolant in the pilot line.

The invention claimed is:
1. A cooling system for cooling a combustion engine, the system comprising:
    a radiator for cooling of coolant which is circulated in the cooling system;
    a pilot line, which has an inlet to receive a small portion of the coolant flow from an inlet line which leads the coolant to the engine;

a thermostat comprising a sensing element configured for monitoring the temperature of the coolant in the pilot line;

a valve configured for directing the coolant from a line of the cooling system to the engine either without cooling the coolant in the radiator at times when the sensing element detects that the coolant in the pilot line is at a lower temperature than a regulating temperature, or to directing the coolant from the cooling system line to the radiator for cooling the coolant before the coolant is led to the engine at times when the sensing element detects that the coolant in the pilot line is at a higher temperature than the regulating temperature;

a selectively activatable and deactivatable thermal device in contact with the coolant in the pilot line at a location upstream of the sensing element in a direction of coolant flow; and a control unit configured to determine temperature of the coolant in the pilot line and to estimate when to alter the coolant's operating temperature in the cooling system and to selectively activate the thermal device to alter temperature of the coolant in the pilot line travelling to the thermostat that the pilot line receives via an inlet for the coolant flow from the inlet line which leads the coolant to the combustion engine, wherein the control unit is configured to activate, based on the determination of the temperature of the coolant in the pilot line, the thermal device to alter the temperature of the coolant in the pilot line travelling to the thermostat to obtain a temperature different than the regulating temperature.

2. A cooling system according to claim 1, wherein the thermal device comprises an electrical warming device which is operable in an active state to warm the coolant in the pilot line to a higher temperature than at the pilot line inlet.

3. A cooling system according to claim 1, wherein the thermal device comprises a heat exchanger in the pilot line which is operable in an active state to having a medium flow through it which is at a higher or lower temperature than the thermostat's regulating temperature.

4. A cooling system according to claim 1, wherein the thermal device comprises a coolant line which is operable in an active state to supply coolant which is at a higher or lower temperature than the thermostat's regulating temperature to the pilot line at a location upstream of the sensing element in the direction of coolant flow.

5. A cooling system according to claim 1, further comprising a second temperature sensor which monitors the coolant's temperature at a location downstream of the thermal device in the pilot line, the control unit is configured for controlling the activation of the thermal device on the basis of information from the second temperature sensor.

6. A cooling system according to claim 1, wherein the control unit is configured for receiving information about a load upon the engine and for activating the thermal device for giving the coolant in the cooling system an operating temperature which varies with the load upon the engine.

7. A cooling system according to claim 1, wherein the cooling system is configured for cooling at least one further component other than the engine using the coolant in the cooling system; and the control unit is configured to receiving information which indicates in advance of when the component requires cooling by the cooling system and then activating the thermal device so that the coolant's operating temperature drops before the component requires cooling by the cooling system.

8. A cooling system according to claim 1, wherein the sensing element comprises a casing containing a substance configured to change phase and consequently to change volume at the thermostat's regulating temperature.

9. A cooling system according to claim 8, wherein the thermostat comprises a motion-transmitting mechanism configured for transmitting motion between the sensing element and the valve so that the valve moves when the substance changes phase between a first valve position at which the valve directs coolant to the engine and a second valve position at which the valve directs coolant to the radiator.

10. A cooling system for cooling a combustion engine, the system comprising:

a radiator for cooling of coolant which is circulated in the cooling system;

a pilot line, which has an inlet to receive a small portion of the coolant flow from an inlet line which leads the coolant to the engine;

a thermostat comprising a sensing element configured for monitoring the temperature of the coolant in the pilot line;

a valve configured for directing the coolant from a line of the cooling system to the engine either without cooling the coolant in the radiator at times when the sensing element detects that the coolant in the pilot line is at a lower temperature than a regulating temperature, or to directing the coolant from the cooling system line to the radiator for cooling the coolant before the coolant is led to the engine at times when the sensing element detects that the coolant in the pilot line is at a higher temperature than the regulating temperature;

a thermal device in contact with the coolant in the pilot line at a location upstream of the sensing element in a direction of coolant flow; and a control unit configured for estimating when to alter the coolant's operating temperature in the cooling system and then activating the thermal device to selectively warm or cool the portion of the coolant in the pilot line that the pilot line receives via an inlet for the coolant flow from the inlet line which leads the coolant to the combustion engine a second temperature sensor which monitors the coolant's temperature at a location downstream of the thermal device in the pilot line, the control unit is configured for controlling the activation of the thermal device on the basis of information from the second temperature sensor.

11. A cooling system for cooling a combustion engine, the system comprising:

a radiator for cooling of coolant which is circulated in the cooling system;

a pilot line, which has an inlet to receive a small portion of the coolant flow from an inlet line which leads the coolant to the engine;

a thermostat comprising a sensing element configured for monitoring the temperature of the coolant in the pilot line;

a valve configured for directing the coolant from a line of the cooling system to the engine either without cooling the coolant in the radiator at times when the sensing element detects that the coolant in the pilot line is at a lower temperature than a regulating temperature, or to directing the coolant from the cooling system line to the radiator for cooling the coolant before the coolant is led to the engine at times when the sensing element detects that the coolant in the pilot line is at a higher temperature than the regulating temperature;

a thermal device in contact with the coolant in the pilot line at a location upstream of the sensing element in a direction of coolant flow; and a control unit configured for estimating when to alter the coolant's operating temperature in the cooling system and then activating the thermal device to selectively warm or cool the portion of the coolant in the pilot line that the pilot line receives via an inlet for the coolant flow from the inlet line which leads the coolant to the combustion engine, wherein the control unit is configured for receiving information about a load upon the engine and for activating the thermal device for giving the coolant in the cooling system an operating temperature which varies with the load upon the engine.

12. A cooling system for cooling a combustion engine, the system comprising:

a radiator for cooling of coolant which is circulated in the cooling system;

a pilot line, which has an inlet to receive a small portion of the coolant flow from an inlet line which leads the coolant to the engine;

a thermostat comprising a sensing element configured for monitoring the temperature of the coolant in the pilot line;

a valve configured for directing the coolant from a line of the cooling system to the engine either without cooling the coolant in the radiator at times when the sensing element detects that the coolant in the pilot line is at a lower temperature than a regulating temperature, or to directing the coolant from the cooling system line to the radiator for cooling the coolant before the coolant is led to the engine at times when the sensing element detects that the coolant in the pilot line is at a higher temperature than the regulating temperature;

a thermal device in contact with the coolant in the pilot line at a location upstream of the sensing element in a direction of coolant flow; and a control unit configured for estimating when to alter the coolant's operating temperature in the cooling system and then activating the thermal device to selectively warm or cool the portion of the coolant in the pilot line that the pilot line receives via an inlet for the coolant flow from the inlet line which leads the coolant to the combustion engine, wherein the cooling system is configured for cooling at least one further component other than the engine using the coolant in the cooling system; and the control unit is configured to receiving information which indicates in advance of when the component requires cooling by the cooling system and then activating the thermal device so that the coolant's operating temperature drops before the component requires cooling by the cooling system.

* * * * *